United States Patent
Recker et al.

(10) Patent No.: US 10,828,968 B2
(45) Date of Patent: Nov. 10, 2020

(54) INSULATED GLASS UNITS INCLUDING SILANOL-INCLUSIVE ADHESIVES, AND/OR ASSOCIATED METHODS

(71) Applicant: Central Glass Company, Limited, Yamaguchi (JP)

(72) Inventors: Duane O. Recker, Auburn, IN (US); Keith Aldrich, Waterloo, IN (US)

(73) Assignee: CENTRAL GLASS COMPANY, LIMITED, Yamaguchi (JP)

( * ) Notice: Subject to any disclaimer, the term of this patent is extended or adjusted under 35 U.S.C. 154(b) by 199 days.

(21) Appl. No.: 13/784,108

(22) Filed: Mar. 4, 2013

(65) Prior Publication Data

US 2013/0302543 A1    Nov. 14, 2013

Related U.S. Application Data

(63) Continuation-in-part of application No. 13/466,541, filed on May 8, 2012.

(51) Int. Cl.
| | |
|---|---|
| *B60J 1/00* | (2006.01) |
| *E06B 7/12* | (2006.01) |
| *C08G 18/73* | (2006.01) |
| *C08G 18/76* | (2006.01) |

(52) U.S. Cl.
CPC .............. *B60J 1/001* (2013.01); *C08G 18/73* (2013.01); *C08G 18/7671* (2013.01); *E06B 7/12* (2013.01)

(58) Field of Classification Search
CPC ................................ E06B 3/663; C08G 18/73
USPC .......................................................... 428/34
See application file for complete search history.

(56) References Cited

U.S. PATENT DOCUMENTS

| | | | |
|---|---|---|---|
| 3,499,744 A | 3/1970 | Tolliver et al. | |
| 3,627,722 A | 12/1971 | Seiter | |
| 3,632,557 A | 1/1972 | Brode et al. | |
| 5,760,155 A * | 6/1998 | Mowrer et al. | 528/28 |
| 6,025,416 A | 2/2000 | Proebster et al. | |
| 7,871,664 B2 | 1/2011 | O'Connor et al. | |
| 8,080,308 B2 | 12/2011 | Wang et al. | |
| 2005/0137324 A1* | 6/2005 | Roesler et al. | 524/589 |

(Continued)

FOREIGN PATENT DOCUMENTS

| | | |
|---|---|---|
| CN | 101218311 A | 7/2008 |
| WO | WO 2010/111174 A1 * | 9/2010 |

OTHER PUBLICATIONS

Material Product Data Sheet for BETASEAL™ 58302N Urethane Sealant; Issue Date: Oct. 14, 2011.

(Continued)

*Primary Examiner* — Samir Shah
*Assistant Examiner* — Tong Guo
(74) *Attorney, Agent, or Firm* — Bass, Berry & Sims, PLC

(57) ABSTRACT

Certain example embodiments relate to techniques for sealing insulating glass (IG) units via an adhesive. The adhesives of certain example embodiments may be applied to the inner surface(s) of the substrates that form the IG unit and/or an outer surface of the spacer, without first priming and/or cleaning the surface(s). These adhesives may be silanol-inclusive moisture-cured adhesives. In certain example instances, the adhesive may be moisture-cured at ambient or other conditions such that the component and the substrate are adapted to survive large temperature fluctuations and vibrational shocks.

14 Claims, 3 Drawing Sheets

(56) References Cited

U.S. PATENT DOCUMENTS

| | | |
|---|---|---|
| 2006/0093828 A1* | 5/2006 | Mandi et al. ............... 428/412 |
| 2007/0237912 A1 | 10/2007 | Correia |
| 2009/0101208 A1 | 4/2009 | Vandal et al. |
| 2010/0090086 A1 | 4/2010 | Zinser et al. |
| 2010/0107505 A1 | 5/2010 | Schreiner et al. |
| 2010/0229853 A1 | 9/2010 | Vandal et al. |
| 2012/0009366 A1* | 1/2012 | Galbraith et al. ............. 428/34 |
| 2012/0253001 A1 | 10/2012 | Radhakrishnan et al. |
| 2012/0255665 A1 | 10/2012 | Vandal et al. |
| 2013/0029074 A1 | 1/2013 | Mahdi et al. |

OTHER PUBLICATIONS

Material Product Data Sheet for BETAMATE™ 1493; Issue Date: Jul. 29, 2011.
SiSiB® SILANES. Silanes for Adhesives & Sealants, Power Chemical Corporation Limited, Jun. 2009.
Technical Data Sheet for LOCTITE® Superflex® Clear RTV Silicone; Dec. 2010.
Technical Data Sheet for PLIOGRIP® 7779 (7400 & 7655) Urethane Adhesive System; Copyright 2012.
U.S. Appl. No. 13/466,541, filed May 8, 2012; Recker et al.
"Dow Automotive" BETASEAL™ 58302N Urethane Adhesive; Mar. 23, 2006.

* cited by examiner

INSULATED GLASS UNITS INCLUDING SILANOL-INCLUSIVE ADHESIVES, AND/OR ASSOCIATED METHODS

This application is a continuation-in-part (CIP) of U.S. application Ser. No. 13/466,541, filed May 8, 2012, the entire contents of which are hereby incorporated herein by reference.

Certain example embodiments of this invention relate to techniques for bonding components to substrates, e.g., for insulated glass (IG) unit related applications. More particularly, certain example embodiments of this invention relate to techniques for forming high-quality seals around the edges of IG units used in, for example, commercial transportation related applications, that are able to survive large temperature swings and large vibrational and/or other mechanical shocks. In certain example embodiments, a silanol-inclusive one-part moisture-cured adhesive may advantageously be used to form the seals in this manner, while also reducing (and sometimes even eliminating) the need to first clean and/or prime the glass substrate(s) and/or spacer used to separate the substrates.

BACKGROUND AND SUMMARY OF EXAMPLE EMBODIMENTS OF THE INVENTION

Various components have been bonded to interior and/or exterior surfaces of glass in a vehicle such as, for example, an automobile. These components have included, for example, lift brackets for door glass, rear view mirrors, rain sensors, side mirrors, and/or other components. A conventional technique for doing so involves priming the glass substrate, and optionally the component to be bonded to the glass substrate, and applying an adhesive to the substrate and/or the component in order to mount the component.

There are a number of example glass primers and adhesives that have been used in various combinations. For instance, primers that have been used in the past include Dow Betaprime primers (e.g., 435-18, 435-20A, 5500, etc.), Lord Chemlok AP 144, and Ashland glass primer 6001. Example adhesives that have been used in the past include, for example, the Dow Betamate adhesive, Ashland Pliogrip, Dow Betaseal 78102, and other two-part reactive urethane adhesives.

These typical bonding materials are applied using conventional techniques and are known to have specific needs in terms of, for example, temperature, time, and other process conditions to achieve cure, and the requisite level of bond strength. However, in order to apply these bonding materials (e.g., adhesives) to the glass substrate using conventional techniques, the substrate itself and oftentimes the component being mounted to the substrate need to be prepared prior to the mounting. In some cases, these conventional preparation steps may lead to higher costs, time delays, and/or inefficient manufacturing steps. Indeed, additional materials tend to cost additional money, and wet-applied cleaning agents and/or primers can be "messy" and in some cases require specialized clean-up.

Thus, it will be appreciated that there is a need in the art for improved techniques for bonding components (e.g., automotive components such as brackets and/or the like) to surfaces of glass substrates.

In certain example embodiments of this invention, a method of adhering a component to a substrate is provided. At least one mating surface of the component is adhered to at least one corresponding mating surface of the substrate using a one part moisture-cured silanol-inclusive adhesive. The adhesive is moisture-cured such that the component and the substrate are adapted to remain adhered to each other upon application of shear forces at least as high as 600 lbf. at a predetermined pull rate in ambient conditions, and at least as high as 300 lbf. at the predetermined pull rate after heating the adhesive to a temperature of 100 degrees C.

In certain example embodiments of this invention, a method of making an article is provided. First and second components are provided, with the first and second components each having at least one respective mating surface. An adhesive is applied to at least one of said mating surfaces, with the adhesive being moisture curable and including silanol termination groups. The components are oriented in a bonding position. Either the adhesive is allowed to moisture-cure, or moisture-curing of the adhesive is promoted, to bond the first and second components to one another in making the article. The mating surfaces are free from primer materials.

In certain example embodiments of this invention, an article is provided. First and second components each have at least one respective mating surface free from any primer materials. A moisture-cured adhesive bonds together the first and second components via their respective mating surfaces, with the adhesive including silanol termination groups. The first and second components are bonded to one another via the adhesive such that they are adapted to remain adhered to one another upon application of forces at least as high as 440 N at pull rates of 0.1-6 inches per minute in ambient conditions and after heating the adhesive to a temperature of 100 degrees C., both before and after prolonged exposure to temperatures and relative humidities above said ambient conditions.

The inventors have also noticed that problems sometimes occur with the seals found around insulated glass (IG) units. IG units have been found in the marketplace for a number of years for a variety of applications. For example, IG units have been used for commercial transportation vehicles (e.g., buses and/or the like), as well as in both residential and commercial settings (e.g., in both residential homes and office buildings as windows, skylights, etc.) and a host of other applications. IG units frequently provide good sound attenuation and are desirable in these and/or other applications.

Conventional IG units are normally made with two sheets of glass. One or both of the sheets of glass sometimes are heat treated (e.g., thermally tempered or heat strengthened), but may be left in the annealed state in other cases. In still other cases, one or both of the substrates may be laminated to another substrate. A spacer, oftentimes made from aluminum, helps maintain the substrates in substantially parallel, spaced-apart relation to one another. The spacer sometimes includes a cavity area that may be filled with a dry dessicant material (e.g., of or including aluminum silicate or the like). A cavity or pocket thus is defined and may be filed with an inert gas such as, for example, Ar, Kr, Xe, and/or the like.

A sealant is formed around the edges and bonds to the spacer and inner peripheral edge surfaces of the substrates. A two-part polysulfide sealant frequently is used. Typical two-part, reactive polysulfide systems include those provided by Fenzi North America. In some cases, the polysulfide material may be mixed and metered, and applied to the outer perimeter of the sandwiched glass. Once the polysulfide has been applied to the gap between the two layers of glass, the polysulfide reacts to form the sealant. During this reaction phase, the polysulfide will cross-link and will form a weak adhesive bond to the glass surfaces.

The weak adhesive bond frequently is problematic, especially when IG units are used in vehicle applications. For example, and as alluded to above, problems have been observed with some conventional IG units. For instance, IG units made with polysulfide-based sealants that are used in commercial transportation applications tend to fail. More particularly, these IG units have a tendency to lose the sealing effect of the polysulfide, and the IG units have a tendency to fog up and to even sometimes fall apart. It is believed that these failures are related to factors such as, for example, the radical temperature swings that a vehicle may encounter, excessive vehicle vibrations (e.g., as a large motor operates, when a bus hits a pothole or encounters uneven roadway surfaces, etc.) that may cause the weak polysulfide bond to the glass surface to fail, and/or the like.

Thus, it will be appreciated that there is a need in the art for improved seals for IG units that are capable of surviving extreme temperature swings and high vibrations, e.g., in connection with commercial transportation related applications.

One aspect of certain example embodiments relates to the inventors' recognition that the same silanol-inclusive moisture curable adhesive material can be used as a suitable sealant material, e.g., in connection with IG units.

In certain example embodiments, a window for a transportation vehicle is provided. First and second glass substrates are oriented in substantially parallel spaced apart relation to one another. A spacer system is provided at peripheral edges of the first and/or second substrates, with a gap being defined by the first and second substrates and the spacer system. A seal is provided around the spacer system and adheres to the spacer system and the first and second substrates. The seal is formed from a moisture-cured adhesive including silanol termination groups. The seal is structured to survive thermal cycling and thermal shocks associated with alternating and repeated placement of the window in (a) a first environment at 80 degrees C. at 80% relative humidity for 4-5 days, and (b) in a second environment at 0 degrees F. for 1-2 days, for at least 4 weeks.

In certain example embodiments, an insulated glass unit is provided. First and second glass substrates are provided in substantially parallel spaced apart relation to one another. A spacer is provided at peripheral edges of the first and/or second substrates, with a gap being defined by the first and second substrates and the spacer, and with the spacer being formed from a material of or including aluminum. A seal is provided around the spacer and adheres to the spacer and the first and second substrates, with the seal being formed from a moisture-cured adhesive including silanol termination groups. The seal is structured so that if the spacer were bonded to either the first or second glass substrate via the adhesive to form a direct bond therebetween, the seal would be sufficiently strong so that the seal would remain intact upon application of forces at least as high as 440 N at pull rates of 0.1-6 inches per minute in ambient conditions and after heating the adhesive to a temperature of 100 degrees C., both before and after prolonged exposure to temperatures and relative humidities above said ambient conditions.

In certain example embodiments, a method of making an insulating glass unit is provided. A spacer system is oriented around a peripheral edge of a first substrate. A second substrate is located on the spacer system so that the first and second substrates are substantially parallel to and spaced apart from one another. An adhesive is applied to one or more mating areas of the spacer system, the first substrate, and the second substrate, with the adhesive being moisture curable and including silanol termination groups. The adhesive is either allowed to moisture-cure, or moisture-curing of the adhesive is promoted, to form a seal that bonds the spacer system, the first substrate, and the second substrate to one another, in making the IG unit. The seal is structured to survive thermal cycling and thermal shocks associated with alternating and repeated placement of the IG unit in (a) a first environment at 80 degrees C. at 80% relative humidity for 4-5 days, and (b) in a second environment at 0 degrees F. for 1-2 days, for at least 4 weeks.

In certain example embodiments, a method of making a window for a commercial transportation vehicle is provided. An IG unit may be made in accordance with the techniques disclosed herein, and framing and/or the like for the IG unit and suitable for the commercial transportation vehicle may be provided.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments described herein relate to the bonding of components (e.g., lift brackets) to glass substrates (e.g., automotive door glass). More particularly, in certain example embodiments, a moisture-cured silanol-terminated adhesive may be used to bond lift brackets to the bottom of door glass used in a vehicle. In certain instances, after moisture curing, these brackets bonded with silanol-inclusive adhesives are able to pass some structural testing of bond strength per typical automotive OEM specifications. For example, the adhesives used to bond brackets to the glass substrate may be able to pass testing such as shear tests at ambient and/or high temperatures, before and/or after exposure to high temperature-high humidity conditioning.

In certain example embodiments, it has advantageously been found that certain example adhesives used to bond brackets or the like to automotive glass may be suitable for application to glass substrates without the need for first preparing, cleaning, and/or priming the glass substrate. In certain instances, these adhesives may still attain the requisite level of bond strength and/or be able to withstand testing in severe environments. For example, it has been found that silanol-inclusive adhesives may be used to advantageously bond together numerous, variable materials without the need for primers and/or cleaning steps in certain example embodiments. Certain example embodiments described herein may reduce the cost of assembled doors in automotive applications, as multiple manufacturing steps may sometimes be completely eliminated. The class of adhesives disclosed herein may in some scenarios be used with glass substrates and components including mating surfaces of or including glass, fritted glass, glass-filled polybutediene teraphalate (PBT), and/or the like. Of course, the example embodiments may be used in connection with different combinations of these materials (e.g., for the main substrate and the component bonded thereto).

Figure 1:
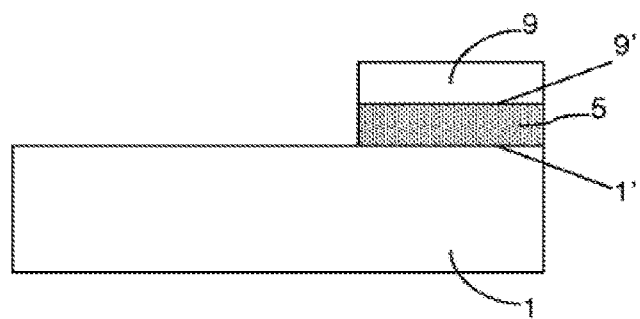
FIG. 1 is a cross-sectional view of a bracket bonded to a glass substrate via an adhesive, according to certain example embodiments.

Referring now more particularly to the drawings, FIG. 1 illustrates a cross-sectional view of component 9 bonded to glass substrate 1 via adhesive 5. The mating surfaces, as illustrated in FIG. 1, are one surface of the glass substrate, and the opposing surface of the bracket material.

In certain example embodiments, the glass substrate 1 may be suitable for use in an automotive door. However, glass substrate 1 may be used for any suitable application in a vehicle of any type in different example embodiments. In some cases, glass substrate 1 may be clear, green, grey, and/or blue colored, and may be from about 1 to 10 mm in thickness, and more preferably about 2 to 6 mm thick in certain instances. Glass substrate 1 may be coated on both sides and/or on one side, e.g., with a solar control coating, an antireflective coating, and/or one or more other types of coating. Substrate 1 may be an uncoated substrate in different example embodiments. In certain instances, adhesive 5 may be a silanol-inclusive one-part moisture-cured adhesive. However, in other examples, adhesive 5 may be a two- or more part adhesive.

As indicated above, the component 9 may be a bracket in certain example embodiments. One particular type of bracket is a lift bracket, e.g., for a vehicle window. Of course, the component 9 may be any suitable component, bracket or otherwise. In certain example embodiments, component 9 may be bonded to substrate 1 via an adhesive 5. The adhesive 5 may be applied to the mating surface 1' of substrate 1, or the mating surface 9' of component 9, or both, according to different example embodiments. However, the mating surface 1' of substrate 1 may not require cleaning and/or priming because of the nature of adhesive 5, in certain example embodiments.

In certain example implementations, if the appropriate substrate material is used for component 9, there may be no need for a primer or promoter to be applied on the mating surface 9' of component 9. For example, if a bracket or other component to be mounted is of or includes thermoplastic urethanes (e.g., glass-filled and/or non-glass-filled TPUs), polybutediene teraphalates (e.g., glass-filled and/or non-glass-filled PBTs), anodized aluminum, clean bare steel, e-coated steel, primed PVC surfaces, and/or the like, in addition to not being necessary to prime the mating surface of the glass substrate, it also may not be necessary to prime a mating surface of the component to be mounted. This may advantageously result in lower manufacturing costs, fewer manufacturing steps, the ability to use "cleaner" environments, etc.

Figure 2A:
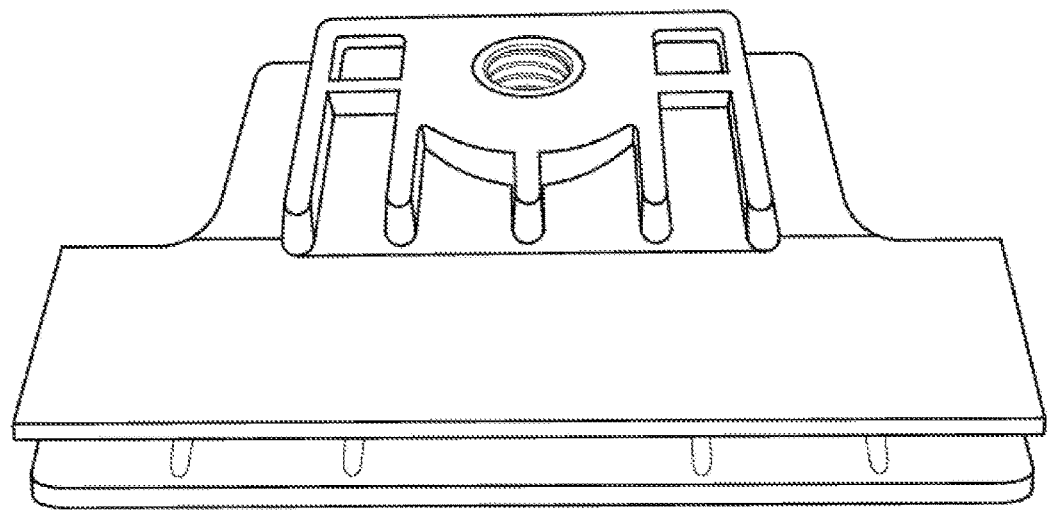
FIG. 2a is a partial perspective view of an example vehicle door lift bracket that may be used in connection with certain example embodiments.
Figure 2B:
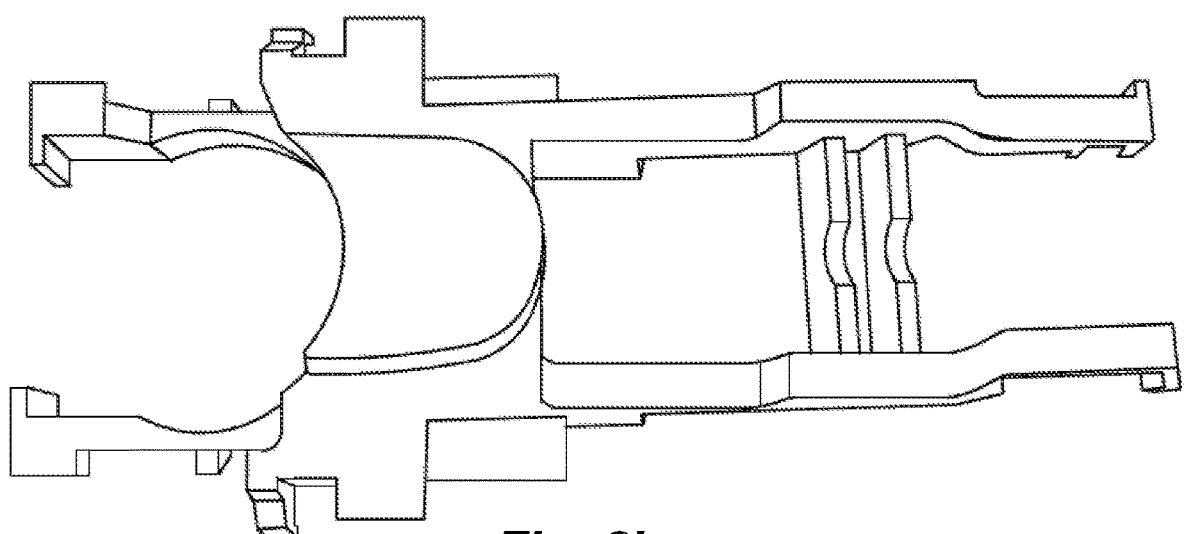
FIG. 2b is a partial perspective view of an example enlarged bracket for connecting a rear view mirror and optionally other components to a vehicle windshield that may be used in certain example embodiments.
Figure 2C:
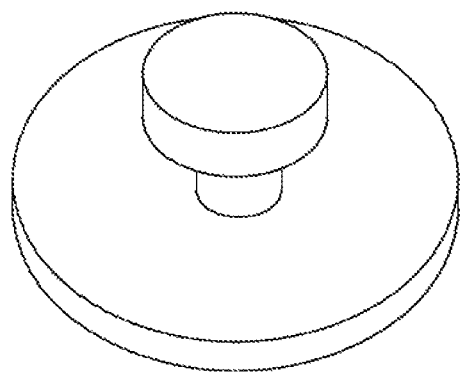
FIG. 2c is a view of a mounting pin that may be used in certain example embodiments.

FIGS. 2a-c are images of example components that may be bonded to glass substrates, e.g., in connection with automotive applications. More particularly, FIG. 2a is a partial perspective view of an example vehicle door lift bracket that may be used in connection with certain example embodiments. The FIG. 2a example bracket may be formed from a material of or include PBT, TPU, and/or the like. A glass substrate, e.g., for use in a vehicle's door, may fit into the channel shown in the FIG. 2a image. Adhesive material may be used to facilitate this connection. FIG. 2b is a partial perspective view of an example enlarged bracket for connecting a rear view mirror and optionally other components to a vehicle windshield that may be used in certain example embodiments. FIG. 2c is a view of a mounting pin that may be used in certain example embodiments. The images shown in FIGS. 2a-2c are provided by way of example. It is noted that these and/or other components of these and/or other materials may be used in different embodiments of this invention, e.g., in automotive and/or other applications. See, for example, the example components shown and described in U.S. Publication No. 2012/0255665, which is hereby incorporated herein by reference.

The adhesives that can be used in connection with certain example embodiments, in general, may be reactive. Reactive adhesives may include one-, two-, or more part curing materials. For example, in multiple- (e.g., two-) part curing adhesives, multiple materials may be mixed in such that they chemically react, in order to cause a reaction that leads to curing. Two- or more part adhesive systems, however, may require that very specific amounts of each material be added, e.g., in order to cause the proper reaction that leads to curing. Two- or more part adhesive systems may also require solvents in certain instances. The solvent may therefore need to be removed prior to, during, and/or after curing, in some instances requiring an additional manufacturing step. Further, two- or more part adhesive systems may require adhesive purging in certain instances.

By contrast, one-part adhesives may be cured via a chemical reaction with an external energy source, such as radiation, heat, and/or moisture. Examples of one-part adhesives include those that can be light- (e.g., UV-) cured, heat-cured, and/or moisture-cured. However, light and/or heat curing one-part adhesives may require costly equipment and/or very particular process conditions in order to properly cure the adhesive.

In certain example embodiments, a moisture-cured adhesive may be a single-part product that is formulated to use moisture as its second component, advantageously reducing and/or eliminating the need for mixing, as well as offering a broader environmentally compatible application capability. Moisture-cured adhesives may be one-part adhesives that cure when they react with moisture present on the substrate surface and/or in the air, in certain instances. For example, the moisture-cured adhesive of certain example embodiments may draw moisture from the atmosphere to cure.

In certain example embodiments, moisture-cured adhesives may be applied independent of the weather (e.g., temperature, humidity and/or dew point conditions), and may dry quickly and/or be surface-tolerant. In addition, the coatings may remain elastic and/or resistant to UV radiation, so as to provide long-term durability in certain example embodiments.

In certain example embodiments, the adhesives used to mount components to automotive glass substrates may include moisture-cured silanol-inclusive adhesives. Certain moisture-cured silanol-inclusive adhesives are commercially available from Dow Automotive, ADCO, Henkel, and/or the like. Examples of suitable commercially available adhesives include Dow Betaseal 58302N and/or Dow Betaseal 58402N. As indicated above, Henkel also has a series of similar silanol-inclusive adhesives in their Terrostat family of moisture-curing adhesives. The following table lists the components of an example silanol-inclusive adhesive material.

TABLE 1

Example Composition of Silanol- and/or Urethane-Inclusive Adhesive

| Component | CAS# | Amount |
|---|---|---|
| MDI BASED URETHANE POLYMER P93-1485 | Not available | ~35-45% |
| Carbon black | 1333-86-4 | ~20-30% |
| Diisononyl phthalate | 28553-12-0 | ~15-25% |
| Phthalic acid, di-C8-10-branched alkyl esters, C9-rich | 68515-48-0 | ~15-25% |
| Calcined clay | 66402-68-4 | ~5-15% |
| Hexamethylene-1,6-diisocyanate homopolymer | 28182-81-2 | <=1% |
| 4,4' Methylenediphenyl diisocyanate | 101-68-8 | <=1% |
| Toluene | 108-88-3 | ~0-10% |

In certain example embodiments, adducts of diisocyanates or polyisocyanate and polyol combinations with an excess of isocyanate groups (prepolymers) may crosslink with atmospheric moisture to yield insoluble higher molecular weight polyurethane/polyureas. This reaction is how many moisture-curing agents (e.g., adhesives) are cured.

More specifically, in certain example embodiments, silanol-inclusive adhesives may include an isocyanate group, which includes nitrogen, carbon, and oxygen. These groups may react with any compound containing an active hydrogen, e.g. alcohols, amines, other urethanes, and/or ureas. For moisture-curing silanol and/or urethane-inclusive adhesives, the active hydrogen containing compound is from atmospheric moisture. The reaction in the adhesive curing may involve a two-stage process. After the adhesive is applied to the glass substrate, the water and the isocyanate groups may produce an amine and carbon dioxide. Next, the amine may then react with other isocyanate groups to form a urea until substantially all available isocyanates are consumed. Carbon dioxide generated during the process may dissipate and/or leave the adhesive through evaporation. Because surface moisture actually completes the chemical reaction in moisture-cured polymers, these coatings adhere well to visibly damp and/or other surfaces. Furthermore, moisture-cured silanol-inclusive adhesives may penetrate into pores and/or tight crevices where moisture is usually present, to form strong chemical bonds. In certain instances, since the moisture is consumed during the curing process, the risk of blisters caused by the water trapped under the coating film (e.g., the cured adhesive) is greatly reduced.

Certain example adhesives that can be used in connection with the embodiments described herein may include a urethane or other "backbone." However, the material may have silanol termination groups. These silanol termination groups may react with inorganic materials on the bonding surfaces to form a very strong covalent bond. For instance, the silanol termination groups may react with silicates, calcium, and/or the like on or at the surface of a glass substrate in certain example embodiments.

In certain example embodiments, the cure rate may be 2-3 millimeters per day under normal environmental conditions. However, it will be appreciated that this curing rate can be affected by, among other things, the temperature and relative humidity conditions. For example, curing can be sped up if the bonded part is placed in an environment with elevated temperature and relative humidity conditions.

It should be noted that in certain instances, if there is too much moisture of the surface of a substrate, curing may occur so quickly that carbon dioxide can become trapped, resulting in pinholes or voids in the coating film. Conversely, in cold temperatures, e.g., below 15 degrees F., moisture levels in the air drop significantly, so the reaction rate of moisture-cured urethanes may be slowed. However, the safe application window for these coatings is still quite large, in many example embodiments.

In certain instances, example advantages of moisture-curing adhesives may include consistency, longevity, reduced down time, curing capability as low as 20 degrees F., curing capability in up to 99% humidity, not being limited by dew point differentials, and reduced volatile organic compound (VOC) formulations. Furthermore, moisture-cured silanol- and/or urethane-inclusive adhesives may be designed with a wide range of physical properties, e.g., from soft and flexible to hard and rigid, in certain example embodiments.

Figure 3:
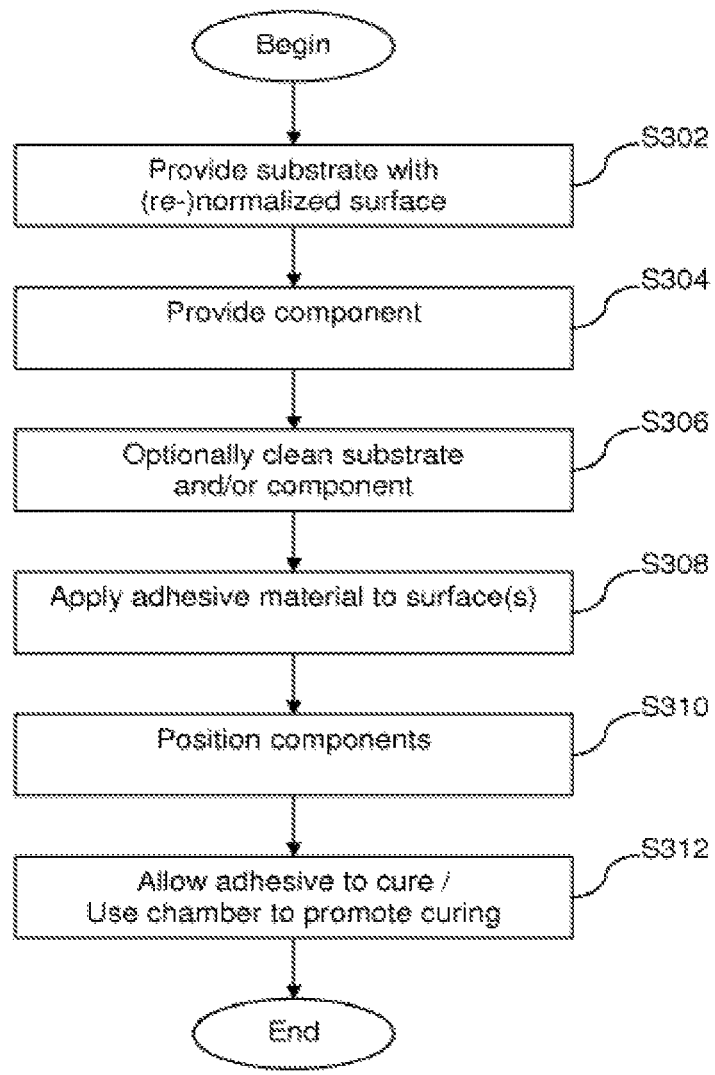
FIG. 3 is a flowchart describing an example method for adhering a component to a glass substrate.

FIG. 3 is a flowchart describing an example method for adhering a component to a glass substrate. As shown in FIG. 3, a substrate is provided with a normalized or re-normalized surface. Some heat treated (e.g., thermally tempered or heat strengthened) substrates or laminated products may undergo changes during such processes that potentially affect the energy level of the surfaces to which components are to be adhered, result in water and/or other elements or compounds "sitting" on the surface, etc. Thus, certain example embodiments may allow surface normalization or re-normalization to occur, e.g., so as to allow for chemisorption into the glass, producing a hydrolyzed surface at a low energy level suitable for subsequent bonding operations. Low energy level surfaces have been found to promote good cross-linking and, thus, it will be appreciated that the quality of the bond can be improved by waiting or promoting normalized or re-normalized surfaces.

The component to be bonded to the substrate (which may be of or include TPU, PBT, e-coated or anodized materials, etc.) is provided in step S304. The substrate and/or the component optionally may be cleaned in step S306, e.g., to remove oils and/or other particles that might be present. The adhesive may be applied to one or more mating surfaces of the substrate and/or the component in step S308 in certain example embodiments. For example, in some cases, the adhesive may be extruded directly onto the glass and/or component mating surface(s), e.g., using a tube with a nozzle, a gear pump system, or other suitable device. The adhesive material preferably has a viscosity and/or other rheological properties that are similar to conventional adherents, e.g., to enable the adhesive to be compatible with existing equipment. As indicated above, certain example embodiments may not involve any primers and/or other surface pre-conditioners.

In step S310, the substrate and component are provided in a bonding position relative to one another, optionally with a robot. For instance, when the component is a lift bracket and the substrate is a vehicle door window, the vehicle door window may be positioned in a substantially U-shaped groove of the bracket. In such scenarios, adhesive material may be provided in the groove and/or on one or both surfaces of the substrate. As another example, when the substrate is a vehicle windshield and the component is a rear view mirror bracket, adhesive material may be provided on an interior surface of the windshield and/or a mating surface of the rear view mirror bracket, and the rear view mirror bracket may be positioned on the larger windshield. Because of the adhesive used, it may be possible to additional fixturing times and/or processes may be reduced and/or eliminated, provided that the components are carefully positioned relative to one another.

In step S312, the adhesive is allowed to cure. The curing may occur from the "outside in" in certain example embodiments, as may be common for some moisture-cured adhesives. The rate of ingress in ambient conditions preferably is 1-10 mm per day, more preferably 2-5 mm per day, and sometimes 2-3 mm per day for the moisture-curing adhesive materials contemplated herein. Cure times may be 2 days to one week in some scenarios, depending on, for example, the size of the parts to be bonded to one another, the environmental conditions, the amount of adhesive used, the quality of the surfaces, etc. In some cases, cure rates may be increased by placing the substrate and the component with the adhesive applied therebetween in a conditioning or curing chamber. Such a conditioning or curing chamber may, for instance, be at a temperature and/or relative humidity above ambient conditions. In such cases, the rate of ingress may be accelerated by a factor of 1.5-3 in certain scenarios.

Although certain example embodiments have been described in connection with an example one-part moisture-cured silanol-terminated adhesive, certain other example embodiments may involve a two or more part adhesive. For example, in certain instances, a first part may be a similar moisture-cured silanol-terminated adhesive with a urethane backbone. However, a second part may include additional hydroxyl groups and/or water molecules. This may in some cases greatly enhance the rate at which the adhesive cures, as the curing may be promoted based on the inclusion of such functional groups directly within the adhesive itself. That is, while some of the example single-part adhesives described above involve moisture-curing from the "outside in," including hydroxyl groups and/or water molecules within a second part of the adhesive may additionally promote curing from "within" the adhesive itself. This may greatly reduce times from the time periods described above to possible 30 minutes, or even lower.

There are a number of different test conditions that may be used to determine whether the adhesive material forms a good bond and is suitable for many commercial applications. A first example test includes a "tensile tester," which involves clamping the bonded article in place, hooking a pin on a cable to the component (e.g., to a hole in the component), and attempting to pull apart the component and the substrate at different speeds. The different pull rates may be anywhere from 0.1"/min. to 6"/min. Pulls are performed in ambient conditions, and different failure modes may or may not result. Many OEMs require the bond to survive forces of 300-400 N (about 67-90 lbf.), and sometimes about 440 N (about 99 lbf.), at a 6"/min pull rate, before a shear mode failure occurs. It is noted that adhesive-type bonds generally can survive higher force pulls when higher pull rates are used.

Another similar test involves letting the article reside in an oven at an elevated temperature (e.g., at 100 degrees C. or 107 degrees C.) for a predetermined time period (e.g., 1 hour or 1.5 hours). The article may reach this elevated temperature, and the above-described shear test may be repeated. The exposure to this elevated temperature environment typically will reduce the force that the adhesive bond can withstand.

Another related test involves placing the article in a severe conditioning environment, which helps to drive moisture into the joint. Typical conditions of such a conditioning chamber include 60 degree C. temperatures and 80% relative humidity. The article may be allowed to reside for a prolonged period of time, which oftentimes will be 5 days. Shear tests as described above (e.g., ambient and hot shear tests) may be performed. Ideally, the conditioning of the article will not severely diminish the values and/or create a different failure mode (e.g., a failure mode in which one part remains attached to the adhesive while the other is removed). If the same or very similar values remain after conditioning, and the same failure modes are experienced, this test may be indicative of a good "permanent" bond. It will be appreciated that the word "permanent" does not mean "permanent for all time." The word "permanent" may instead refer to survivability for at least a specified amount of time, which may be a matter of years, the expected or actual lifetime of the article, etc.

As an example of a suitable adhesive material that may be used in connection with certain example embodiments, Dow Betaseal 58302N was used to bond a glass-filled PBT bracket directly to a glass substrate, without priming the mating surface of the glass substrate or that of the bracket. The curing was performed in ambient temperatures and normal humidity.

Test results following the curing of the adhesive have been very positive. These tests include shear tests at ambient temperatures, hot shear tests conducted at 107 degrees C., shear tests conducted after test sample conditioning at 60 degrees C. and 80% relative humidity for 5 days. All test results show cohesive failure of the adhesive at various pull values. For example, no failures were detected at over 700 lbf. of force at a 1"/min. pull rate in an ambient environment. It will be appreciated from the discussion above that this is a 6-7× improvement over typical minimum OEM specifications. The adhesive was able to withstand a force of 350-400 lbf. before failure, at a pull rate of 1"/min., during a hot shear test. In addition, after exposure to a conditioning environment as explained above, the adhesive demonstrated the same values and same failure modes, suggesting that the adhesive forms a good "permanent" bond. These actual test results are comparable to well-formed two-part urethane-based adhesives that are currently used in some automotive applications. The adhesive is expected to also perform comparably for lap shear tests of the article, torque tests, and at high peel loads, given the adhesive being bonded to a single component.

In certain example embodiments, the adhesives and techniques described herein may advantageously permit lowered manufacturing costs. In certain instances, no glass priming may be necessary. In further examples, bracket priming may also be avoided. This may permit faster assembly times, and lower assembly capital costs; as the number of manufacturing steps may be reduced.

Furthermore, the use of a one-part moisture-cured adhesive may eliminate the need for adhesive purging that may be necessary when using two-part adhesive systems. There is advantageously no need to monitor ratios of mixed materials, as when using a two-part adhesive system. Overall, certain example techniques as discussed herein may advantageously yield a lower cost method of attaching components to glass substrates, particularly in automotive applications.

The example techniques used herein also may be applicable to non-automotive applications including residential or commercial farm or construction equipment, or any application where it is desirable to bond brackets of the materials described herein to glass or other similar materials. Such further applications may include, for example, solar photovoltaic applications, shower door bars and/or handles, bars and/or handles for use on mass transit vehicles, and/or the like.

In still other examples, the component may be a different type of bracket and/or hardware element. For example, while certain examples have been discussed in connection with bonding lift brackets to door glass, the example techniques and/or adhesives described herein may be applied to large brackets for holding sensors, rear view mirrors, other elements that are mounted to vehicle windshield interiors, front windshields for automotive applications, rear windshields, side windshields, sun/moon roofs, etc. Furthermore, certain example techniques disclosed herein may be used in connection with large brackets for holding a plurality of elements. Certain example embodiments may relate to large brackets that resist loading and pass structural testing of bond strength. It will be appreciated that the example techniques described herein may also be applied to other brackets including, for example, smaller brackets for holding only one or a few of the same or different components, brackets that are not intended to bear a significant load in service, brackets that are not required to pass structural adhesive tests and standards, etc. Still further, although an example bracket was shown and described in connection with FIGS. 1-2, other bracket designs are of course possible in different embodiments of this invention. Such alternative bracket designs may have one, two, three, or any number of mating surfaces, e.g., as appropriate for the design of the bracket and the mounting requirements often imposed by OEMs.

In certain example embodiments, the silanol- and/or urethane-inclusive adhesives are disposed directly on a mating surface of both the component and the substrate to which that component is to be bonded (e.g., a bracket and a glass substrate, respectively).

As indicated above, the inventors have also noticed that problems sometimes occur with the seals found around insulated glass (IG) units and that such weak seals sometimes fail when large temperature swings and/or vibrations are encountered. This can be particularly problematic where IG units are used as windows, e.g., in commercial and/or other transportation vehicles (such as buses or the like). However, the inventor recognized that the same silanol-inclusive moisture curable adhesive material described above can be used as a suitable sealant material, e.g., in connection with such IG units.

Figure 4:
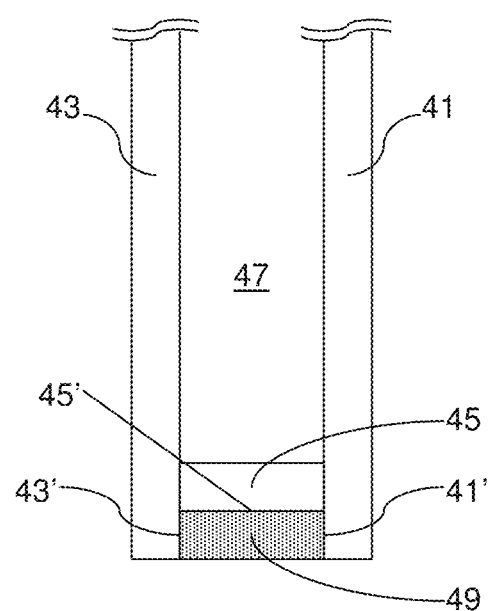
FIG. 4 is a partial cross-sectional view of an insulated glass (IG) unit in accordance with certain example embodiments.

Thus, in certain example embodiments, the silanol-inclusive moisture curable adhesive material is used as a seal that bonds to the inner surfaces of the substrates of the IG unit, and the spacer material. In this regard, FIG. 4 is a partial cross-sectional view of an IG unit in accordance with certain example embodiments. As shown in FIG. 4, first and second substrates 41 and 43 are provided in substantially parallel, spaced apart relation to one another. One or both of the first and second substrates 41 and 43 may be annealed or heat treated (e.g., thermally tempered or heat strengthened), chemically tempered, laminated to another substrate (e.g., another glass substrate with a suitable laminating material such as PVB, EVA, PET, PU, or the like), etc. Different combinations and sub-combinations also are possible. A spacer system 45 is provided around peripheral edges. The spacer may be made of any suitable material such as, for example, aluminum, stainless steel, etc.

A cavity or gap 47 thus is formed, and it may be backfilled with oxygen and/or an inert gas (such as, for example, Ar, Kr, Xe, and/or the like). In certain example embodiments, and although not shown in FIG. 4, a dessicant material may be provided in an opening of the spacer system. That is, the dessicant material may be exposed to the cavity or gap 47, e.g., to help absorb free radicals and/or other contaminants that might otherwise degrade the insulative performance of the unit as a whole.

A seal 49 also may be provided between the first and second substrates 41 and 43. More particularly, the seal 49 may be formed on inner peripheral edges 41' and 43' of the first and second substrates 41 and 43, as well as an outer surface 45' of the spacer system 45. The adhesive material used to create the seal 49 may, for example, be the same silanol-inclusive material as described above in certain example embodiments. The use of a moisture curing silanol-inclusive adhesive (such as Dow's Betaseal 58302N and the other materials identified above) provides a much higher adhesion value relative to the glass, and will survive the greater temperature swings and vehicle vibrations, as compared to conventional polysulfide-based seals. The adhesive materials of certain example embodiments also are advantageous over conventional polysulfide-based seals, as the latter is known to degrade when exposed to sunlight, whereas the former does not suffer from the same problems. The design of certain example embodiments thus is expected to yield a higher performing, and potentially longer-lasting, IG unit that can be successfully used in the transportation arena, among other areas.

The inventors prepared a sample, using Dow's Betaseal 58302N to hold together two tempered glass substrates that, together with an aluminum spacer, formed an IG unit. The sample was compared to a conventional polysulfide-based IG unit, referred to below as the comparative example. More particularly, both the sample and the comparative example were subjected to a hot and cold cycling test. As a part of that test, both the sample and the comparative example were subjected to 80 degree C. temperatures in an environment with 80% relative humidity. After 5 days, the sample and the comparative example were placed in a freezer at 0 degrees F. for 2 days. Movement to the freezer from the high temperature/high humidity environment also served as a thermal shock test, given the large temperature difference. Breakage and/or erosion of the seal during cycling back and forth between the hot and cold environments would have allowed moisture to creep into the cavity. Moisture would be noticeable as condensation, fog, ice, or the like would then become visible in the cavity (e.g., on an inner surface of one of the substrates). It was observed that the sample survived 6 weeks of this cycling before evidencing failure of the silanol-inclusive seal. By contrast, polysulfide-based seal of the comparative example exhibited failure in half of that time. In other words, it was found that IG units produced in accordance with certain example embodiments could survive about twice as long as conventional IG units that include polysulfide-based seals.

The inventors also tested the failure mode of the adhesive seal of various samples produced in accordance with the example techniques disclosed herein. In essence, the inventors "broke apart" the IG unit, looking for how the seal behaved. It was found that the seal remained adhered to one of the glass substrates and the spacer as a cohesive unit, which is suggestive of a cohesive failure mode rather than an adhesive failure mode (e.g., where the seal would be expected to rip apart and remain on multiple different components). By contrast, conventional IG units with polysulfide-based seals have been known to sometimes spontaneously break and, in general, the adhesive failure mode dominates. Thus, it was determined that the silanol-inclusive seals of certain example embodiments better adheres to the glass.

The vibrational performance of the silanol-inclusive seals of certain example embodiments is expected to surpass that of conventional IG units. For example, silanol-inclusive adhesives are good vibrational absorbers and typically will out-perform commercially used urethane-based adhesives when it comes to the ability to withstand vibrational and/or other mechanical shocks. Thus, it is expected that the silanol-inclusive seals of certain example embodiments will out-perform urethane-based seals, as well as the polysulfide-based seals common in many conventional IG units.

Techniques that are the same as or similar to those described above may be used in making the IG units and/or windows discussed above. For instance, an IG unit may be made by orienting a spacer system around a peripheral edge of a first substrate. A second substrate may be located on the spacer system so that the first and second substrates are substantially parallel to and spaced apart from one another. An adhesive may be applied to one or more mating areas of the spacer system, the first substrate, and the second substrate, with the adhesive being moisture curable and including silanol termination groups. The adhesive may be either allowed to moisture-cure, or moisture-curing of the adhesive may be promoted, e.g., to form a seal that bonds the spacer system, the first substrate, and the second substrate to one another, in making the IG unit. The seal may be structured to survive thermal cycling and thermal shocks associated with alternating and repeated placement of the window in (a) a first environment at 80 degrees C. at 80% relative humidity for 4-5 days, and (b) in a second environment at 0 degrees F. for 1-2 days, for at least 4 weeks.

Primers for some or all of the mating surfaces (e.g., of the substrates and the spacers) are optional and may or may not be included in different embodiments. Similarly washing/cleaning processes are optional and may or may not be included in different embodiments. Some or all of the mating areas may be hydrolyzed and/or at a low energy level.

The rates of ingress for the curing may be the same as or similar to the rates identified above in certain example embodiments. Similarly, in certain example embodiments, moisture curing may be allowed to occur, and/or may be promoted, in environments that are the same as or similar to those discussed above.

Similar to the discussion above, in certain example embodiments, the seal may be structured so that if the spacer were bonded to either the first or second glass substrate via the adhesive to form a direct bond therebetween, the seal would be sufficiently strong so that the seal would remain intact upon application of forces at least as high as 440 N at pull rates of 0.1-6 inches per minute in ambient conditions and after heating the adhesive to a temperature of 100 degrees C., both before and after prolonged exposure to temperatures and relative humidities above said ambient conditions. More preferably, in certain example embodiments, the seal may be structured so that if the spacer were bonded to either the first or second glass substrate via the adhesive to form a direct bond therebetween, the seal would be sufficiently strong so that the seal would remain intact upon application of forces at least as high as 700 lbf. at a pull rate of 1 inch per minute in ambient conditions and at least as high as 350 lbf. at a pull rate of 1 inch per minute after heating the adhesive to a temperature of 100 degrees C., both before and after prolonged exposure to temperatures and relative humidities above said ambient conditions.

It is noted that one or more low-emissivity or low-E coatings may be used in connection with certain example embodiments. As is known, low-E coatings typically involve an infrared (IR) reflecting layer (e.g., of or including silver) sandwiched between first and second dielectric layers or dielectric layer stacks. The low-E coating(s) herein may include one or more IR reflecting layers. For example, certain example embodiments may incorporate the low-E coatings described and/or illustrated in any of U.S. Pat. Nos. 7,998,320; 7,771,830; 7,198,851; 7,189,458; 7,056,588; and 6,887,575; and/or U.S. Publication Nos. 2012/0219821; 2012/0164420; and 2009/0115922, the entire contents of each of which are all hereby incorporated herein by reference. The low-E coating may be provided on any one or more surfaces of an IG unit (e.g., surfaces 1, 2, 3, and/or 4) in different example embodiments.

Similarly, an antireflective (AR) coating may be provided on any one or more surfaces of an IG unit in certain example embodiments. In certain example embodiments, an AR coating may be provided on each surface (or at least each interior surface) of an IG unit on which a low-E is not provided.

Although certain example embodiments have been described in connection with commercial transportation vehicles (such as buses and/or the like), it will be appreciated that the example techniques described herein may be used in connection with a variety of different applications. For example, the IG units may be used as windows, skylights, transoms, sidelites, and/or the like in residential (e.g., home) and/or commercial (e.g., office building) settings. The recognition that an adhesive may be used as an edge seal may have uses in monolithic embodiments, as well, e.g., where a laminated structure is used as a vehicle windshield or window, residential or commercial window or the like, etc.

Certain example embodiments have been described in connection with IG units include two substrates. This includes, for example, vacuum insulated glass (VIG) units, where first and second substrates are separated from one another via a plurality of pillars and an edge seal material that oftentimes is made of a glass frit material, and in which the area between the two substrates is evacuated to a pressure less than atmospheric. In such cases, the seal may connect with the substrates and the frit or other edge seal material.

It is noted, however, that the example techniques disclosed herein may be used in connection with units that include more than two substrates. This includes the laminated assemblies discussed above, as well as so-called "triple glaze" IG units, where first and second substrates are separated by a first spacer system, and second and third substrates are separated by a second spacer system. In such cases, two different seals may be provided, one for each of the spacer systems. In other cases, one large seal may be provided.

"Peripheral" and "edge" seals herein do not mean that the seals are located at the absolute periphery or edge of the unit, but instead mean that the seal is at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s).

As noted above, one or more of the substrates may be heat treated (e.g., heat strengthened and/or thermally tempered), and/or chemically tempered, in certain example embodiments. The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments.

Although an element, layer, layer system, coating, or the like, may be said to be "on" or "supported by" a substrate, layer, layer system, coating, or the like, other layers and/or materials may be provided therebetween. Thus, for example, the seals described above may be considered "on" and "supported by" the substrates even if other layer(s) (e.g., low-E coatings) are provided therebetween.

In certain example embodiments, a window for a transportation vehicle is provided. First and second glass substrates are in substantially parallel spaced apart relation to one another. A spacer system is provided at peripheral edges of the first and/or second substrates, with a gap being defined by the first and second substrates and the spacer system. A seal is provided around the spacer system and adheres to the spacer system and the first and second substrates, with the seal being formed from a moisture-cured adhesive including silanol termination groups and being structured to survive thermal cycling and thermal shocks associated with alternating and repeated placement of the window in (a) a first environment at 80 degrees C. at 80% relative humidity for 4-5 days, and (b) in a second environment at 0 degrees F. for 1-2 days, for at least 4 weeks.

In addition to the features of the previous paragraph, in certain example embodiments, the adhesive may include first and second parts, the first part including a urethane backbone and the silanol termination groups, the second part including hydroxyl groups and/or water.

In addition to the features of either of the two previous paragraphs, in certain example embodiments, the seal may be structured to survive thermal cycling and thermal shocks associated with alternating and repeated placement of the window in (a) a first environment at 80 degrees C. at 80% relative humidity for 5 days, and (b) in a second environment at 0 degrees F. for 2 days.

In addition to the features of any of the three previous paragraphs, in certain example embodiments, the seal may be structured to survive the thermal cycling and thermal shocks associated with the alternating and repeated placement of the window in the first environment and the second environment, for 6 weeks.

In addition to the features of any of the four previous paragraphs, in certain example embodiments, the seal may be structured to exhibit a cohesive failure mode, as opposed to an adhesive failure mode, upon the window being broken apart.

In addition to the features of any of the five previous paragraphs, in certain example embodiments, failure of the seal may be evidenced by the presence of moisture and/or condensation in the gap.

In certain example embodiments, an IG unit is provided. First and second glass substrates are in substantially parallel spaced apart relation to one another. A spacer is provided at peripheral edges of the first and/or second substrates, and a gap is defined by the first and second substrates and the spacer. The spacer is formed from a material of or including aluminum. A seal is provided around the spacer and adheres to the spacer and the first and second substrates, with the seal being formed from a moisture-cured adhesive including silanol termination groups. The seal is structured so that if the spacer were bonded to either the first or second glass substrate via the adhesive to form a direct bond therebetween, the seal would be sufficiently strong so that the seal would remain intact upon application of forces at least as high as 440 N at pull rates of 0.1-6 inches per minute in ambient conditions and after heating the adhesive to a temperature of 100 degrees C., both before and after prolonged exposure to temperatures and relative humidities above said ambient conditions.

In addition to the features of the previous paragraph, in certain example embodiments, the seal may be structured so that if the spacer were bonded to either the first or second glass substrate via the adhesive to form a direct bond therebetween, the seal would be sufficiently strong so that the seal would remain intact upon application of forces at least as high as 700 lbf. at a pull rate of 1 inch per minute in ambient conditions and at least as high as 350 lbf. at a pull rate of 1 inch per minute after heating the adhesive to a temperature of 100 degrees C., both before and after prolonged exposure to temperatures and relative humidities above said ambient conditions.

In addition to the features of either of the two previous paragraphs, in certain example embodiments, the seal may be structured to fail as a cohesive unit.

In addition to the features of any of the three previous paragraphs, in certain example embodiments, the adhesive may include first and second parts, the first part including a urethane backbone and the silanol termination groups, the second part including hydroxyl groups and/or water.

In addition to the features of any of the four previous paragraphs, in certain example embodiments, the seal may be structured to survive thermal cycling and thermal shocks associated with alternating and repeated placement of the IG unit in (a) a first environment at 80 degrees C. at 80% relative humidity for 4-5 days, and (b) in a second environment at 0 degrees F. for 1-2 days, for 4-6 weeks.

In certain example embodiments, a method of making an insulating glass unit is provided. A spacer system is oriented around a peripheral edge of a first substrate. A second substrate is located on the spacer system so that the first and second substrates are substantially parallel to and spaced apart from one another. An adhesive is applied to one or more mating areas of the spacer system, the first substrate, and the second substrate, with the adhesive being moisture curable and including silanol termination groups. The adhesive is either allowed to moisture-cure, or moisture-curing of the adhesive is promoted, to form a seal that bonds the spacer system, the first substrate, and the second substrate to one another, in making the IG unit. The seal is structured to survive thermal cycling and thermal shocks associated with alternating and repeated placement of the IG unit in (a) a first environment at 80 degrees C. at 80% relative humidity for 4-5 days, and (b) in a second environment at 0 degrees F. for 1-2 days, for at least 4 weeks.

In addition to the features of the previous paragraph, in certain example embodiments, the spacer system may be formed from a material of or including aluminum.

In addition to the features of either of the two previous paragraphs, in certain example embodiments, formation of the seal may be accomplished without using a primer.

In addition to the features of any of the three previous paragraphs, in certain example embodiments, at least some of the mating areas may be cleaned prior to said applying of the adhesive.

In addition to the features of any of the four previous paragraphs, in certain example embodiments, moisture-curing may be accomplished at a rate of 2-3 mm ingress per day.

In addition to the features of any of the five previous paragraphs, in certain example embodiments, moisture-curing may be practiced in connection with a curing chamber operating at temperature and/or relative humidity levels higher than corresponding ambient conditions.

In addition to the features of any of the six previous paragraphs, in certain example embodiments, at least some of the mating areas may be hydrolyzed and/or at a low energy level.

In addition to the features of any of the seven previous paragraphs, in certain example embodiments, the adhesive may include first and second parts, the first part including a urethane backbone and the silanol termination groups, the second part including hydroxyl groups and/or water.

In addition to the features of any of the eight previous paragraphs, in certain example embodiments, the seal may be structured to survive thermal cycling and thermal shocks associated with alternating and repeated placement of the IG unit in (a) a first environment at 80 degrees C. at 80% relative humidity for 5 days, and (b) in a second environment at 0 degrees F. for 2 days.

In addition to the features of any of the nine previous paragraphs, in certain example embodiments, the seal may be structured to survive the thermal cycling and thermal shocks associated with the alternating and repeated placement of the IG unit in the first environment and the second environment, for 6 weeks.

In addition to the features of any of the ten previous paragraphs, in certain example embodiments, survival of the thermal cycling and thermal shocks may be defined as an absence of moisture and/or condensation being observable on inner surfaces of the first and second substrates immediately after removal from the second environment, and the seal may be structured to exhibit a cohesive failure mode upon the IG unit being broken apart.

In certain example embodiments, a method of making a window for a commercial transportation vehicle is provided. An IG unit may be made in accordance with the techniques of any of the previous 11 paragraphs, and framing and/or the like for the IG unit and suitable for the commercial transportation vehicle may be provided.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A transportation vehicle window, comprising:
   first and second glass substrates in substantially parallel spaced apart relation to one another;
   a spacer system provided at peripheral edges of the first and/or second substrates, a gap being defined by the first and second substrates and the spacer system; and
   a seal provided around the spacer system and adhering to the spacer system and the first and second substrates, the seal being formed from a moisture-cured adhesive including silanol termination groups, the seal being structured to survive thermal cycling and thermal shocks associated with alternating and repeated placement of the transportation vehicle window in (a) a first environment at 80 degrees C. at 80% relative humidity for 4-5 days, and (b) in a second environment at 0 degrees F. for 1-2 days, for at least 4 weeks.

2. The window of claim 1, wherein the adhesive includes first and second parts, the first part including a urethane backbone and the silanol termination groups, the second part including hydroxyl groups and/or water.

3. The window of claim 1, wherein the seal is structured to survive thermal cycling and thermal shocks associated with alternating and repeated placement of the window in (a) a first environment at 80 degrees C. at 80% relative humidity for 5 days, and (b) in a second environment at 0 degrees F. for 2 days.

4. The window of claim 3, wherein the seal is structured to survive the thermal cycling and thermal shocks associated with the alternating and repeated placement of the window in the first environment and the second environment, for 6 weeks.

5. The window of claim 1, wherein the seal is structured to survive the thermal cycling and thermal shocks associated with the alternating and repeated placement of the window in the first environment and the second environment, for 6 weeks.

6. The window of claim 1, wherein the seal is structured to exhibit a cohesive failure mode, as opposed to an adhesive failure mode, upon the window being broken apart.

7. The window of claim 1, wherein failure of the seal is evidenced by the presence of moisture and/or condensation in the gap.

8. A vehicle including the window of claim 1.

9. A transportation vehicle insulated glass (IG) window unit, comprising:
   first and second glass substrates in substantially parallel spaced apart relation to one another;
   a spacer provided at peripheral edges of the first and/or second substrates, a gap being defined by the first and second substrates and the spacer, the spacer being formed from a material of or including aluminum; and
   a seal provided around the spacer and adhering to the spacer and the first and second substrates, the seal being formed from a moisture-cured adhesive including silanol termination groups,
   wherein the seal is structured so that if the spacer were bonded to either the first or second glass substrate via the adhesive to form a direct bond therebetween, the seal would be sufficiently strong so that the seal would remain intact upon application of forces at least as high as 440 N at pull rates of 0.1-6 inches per minute to the transportation vehicle IG window unit in ambient conditions and after heating the adhesive to a temperature of 100 degrees C., both before and after prolonged exposure to temperatures and relative humidities above said ambient conditions.

10. The IG unit of claim 9, wherein the seal is structured so that if the spacer were bonded to either the first or second glass substrate via the adhesive to form a direct bond therebetween, the seal would be sufficiently strong so that the seal would remain intact upon application of forces at least as high as 700 lbf. at a pull rate of 1 inch per minute in ambient conditions and at least as high as 350 lbf. at a pull rate of 1 inch per minute after heating the adhesive to a temperature of 100 degrees C., both before and after prolonged exposure to temperatures and relative humidities above said ambient conditions.

11. The IG unit of claim 9, wherein the seal is structured to fail as a cohesive unit.

12. The IG unit of claim 9, wherein the adhesive includes first and second parts, the first part including a urethane backbone and the silanol termination groups, the second part including hydroxyl groups and/or water.

13. The IG unit of claim 9, wherein the seal is structured to survive thermal cycling and thermal shocks associated with alternating and repeated placement of the IG unit in (a) a first environment at 80 degrees C. at 80% relative humidity for 4-5 days, and (b) in a second environment at 0 degrees F. for 1-2 days, for 4-6 weeks.

14. A vehicle including the IG window unit of claim 9.

\* \* \* \* \*